H. D. McLEAN & C. WARING.
DIRIGIBLE HEADLIGHT.
APPLICATION FILED JUNE 13, 1916.
1,230,741.
Patented June 19, 1917.
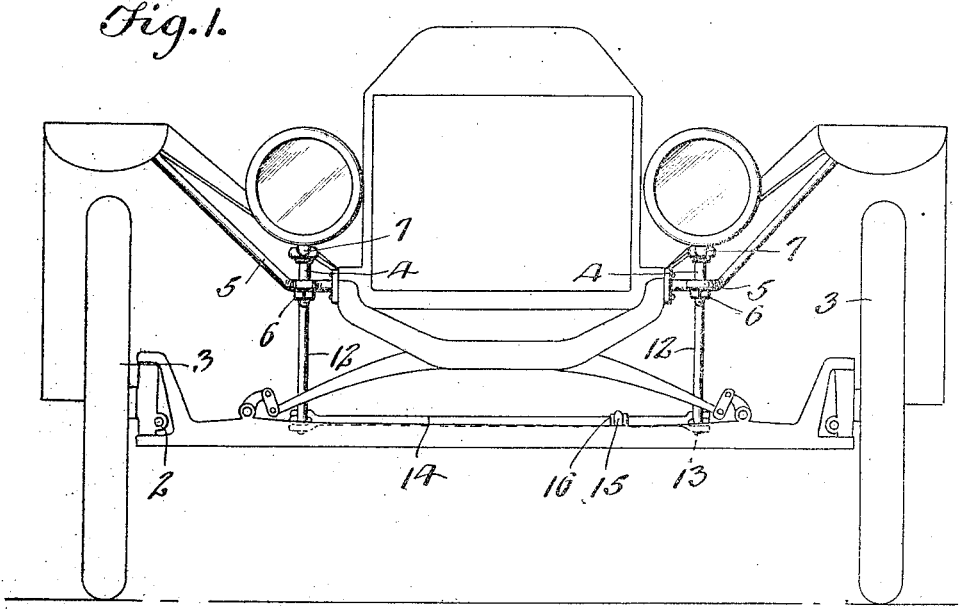
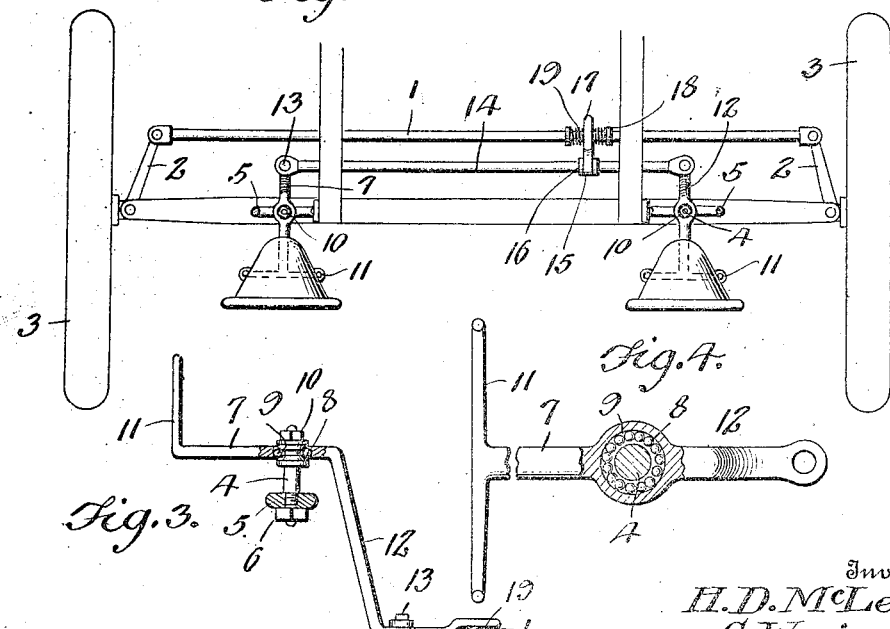
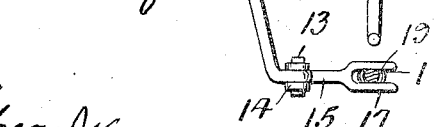
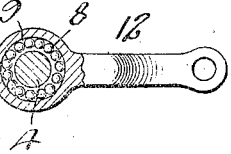
Inventors
H. D. McLean
C. Waring,
By Victor J. Evans
Attorney
Witnesses

UNITED STATES PATENT OFFICE.

HARRY D. McLEAN AND CHARLES WARING, OF CARSTAIRS, ALBERTA, CANADA.

DIRIGIBLE HEADLIGHT.

1,230,741. Specification of Letters Patent. Patented June 19, 1917.

Application filed June 13, 1916. Serial No. 103,549.

*To all whom it may concern:*

Be it known that we, HARRY D. McLEAN and CHARLES WARING, subjects of the King of Great Britain, residing at Carstairs, in the Province of Alberta and Dominion of Canada, have invented new and useful Improvements in Dirigible Headlights, of which the following is a specification.

This invention relates to dirigible headlamps especially designed for use upon automobiles, motor trucks and the like, the broad object of the invention being to provide in connection with a pair of headlamps, levers supporting headlamps and pivotally supported between their ends on the machine, said levers being coupled together and also connected to the rod which connects the steering knuckle arms, so that when the operator turns the steering wheels of the machine to one side or the other, a corresponding movement is imparted to the headlamps thereby illuminating that portion of the road surface which is to be followed by the machine. By reason of the arrangement referred to and hereinafter particularly described, driving at night is rendered much safer and many accidents avoided.

With the above and other objects in view, the invention consists in the novel construction, combination and arrangement of parts, as herein described, illustrated and claimed.

In the accompanying drawings:—

Figure 1 is a front elevation of an automobile illustrating the mechanism of this invention in its applied relation thereto.

Fig. 2 is a diagrammatic plan view illustrating the operation of the lamp turning mechanism.

Fig. 3 is a detail sectional view illustrating the manner of mounting the lamp carrying members.

Fig. 4 is an enlarged plan view, partly in section, of the lamp support.

Referring to the drawings 1 designates the usual connecting rod which is pivotally coupled at its opposite extremities to the steering arms 2 of the knuckles upon the spindles of which the steering wheels 3 are journaled, all of said parts being of the usual construction and arrangement now in present use.

In carrying out the present invention, we provide two substantially vertical posts 4 which are threaded as shown and screwed through openings in the mudguard supporting irons 5 arranged at each side of the machine and having a fixed relation to the body thereof. Each of said posts 4 is prevented from turning by means of a lock nut 6 or equivalent means threaded on the lower end portion of the post 4 and bearing tightly against the under side of the iron or bracket 5 which supports one of the front fenders or mudguards.

In connection with the posts 4 we employ a pair of lamp carrying members 7 each of which is in the form of a two-armed lever pivotally mounted between its ends on the post 4 where it is provided with ball bearings 8 embodying adjustable bearing cups or races 9 above and below the horizontal center of each member 7. After the ball bearings have been properly adjusted, the adjustment is fixed by means of a lock nut 10 threaded on the upper extremity of each post 4.

Each lamp carrying member is provided at its forward extremity in advance of its pivot with the usual U-shaped lamp carrying bracket 11. The rear arm of the lever 7 is extended downwardly or formed with a substantially pendent portion 12 which is connected by means of a pivot 13 to one extremity of a connecting rod 14. It is to be understood that two lamp carrying members 7 are employed and that they are connected pivotally to the opposite extremities of the connecting rod 14 thereby causing an equal turning movement of the members 7.

Interposed between the connecting rods 1 and 14 is a yoke 15 one end of which is formed with a hole to receive the connecting rod 14, the latter being provided with stop collars 16 which prevent the yoke 15 from moving lengthwise of the rod 1 while permitting it to turn slightly around the same. At its opposite end the yoke 15 is formed with a fork 17 so as to provide for a sliding and rocking engagement between the yoke 15 and the connecting rod 1. The forked portion of the yoke 15 is slidable between collars 18 fast on the rod 1 and arranged in spaced relation to each other, cushioning springs 19 being preferably interposed between the collars 18 and the forked end of the yoke 15 to bring sudden thrusts caused by the action of the steering wheels on a rough road surface from being transmitted to the rod 14 and the lamps.

It will now be understood that when the steering mechanism of the vehicle is operated, the connecting rod 1 is moved substantially in the direction of its length and a corresponding movement is imparted by means of the yoke 15 to the connecting rod 14. This results in swinging the lamp carrying members 7 on their pivotal mounting causing the headlamps to direct their rays of light therefrom substantially at the same angle to which the steering wheels of the machine are turned. It will also be understood that various changes in the form proportion and minor details of construction may be resorted to without departing from the spirit or sacrificing any of the advantages of the invention.

We claim:—

The combination with the frame of a motor vehicle, of lamp supporting members secured thereto, lamp carrying members journaled on said bearing members, a rod pivotally connecting said lamp carrying members, a yoke journaled on said connecting rod to turn on a horizontal axis, spaced collars on said connecting rod between which said yoke is positioned, a fork on said yoke straddling the knuckle arm connecting rod of the steering mechanism of the motor vehicle and having a sliding and rocking relation to the last named rod, collars fast on the last named rod arranged in spaced relation to the fork of said yoke, and cushioning springs surrounding the last named rod and interposed between said collars and fork.

In testimony whereof we affix our signatures.

HARRY D. McLEAN.
CHARLES WARING.